Figure 1:
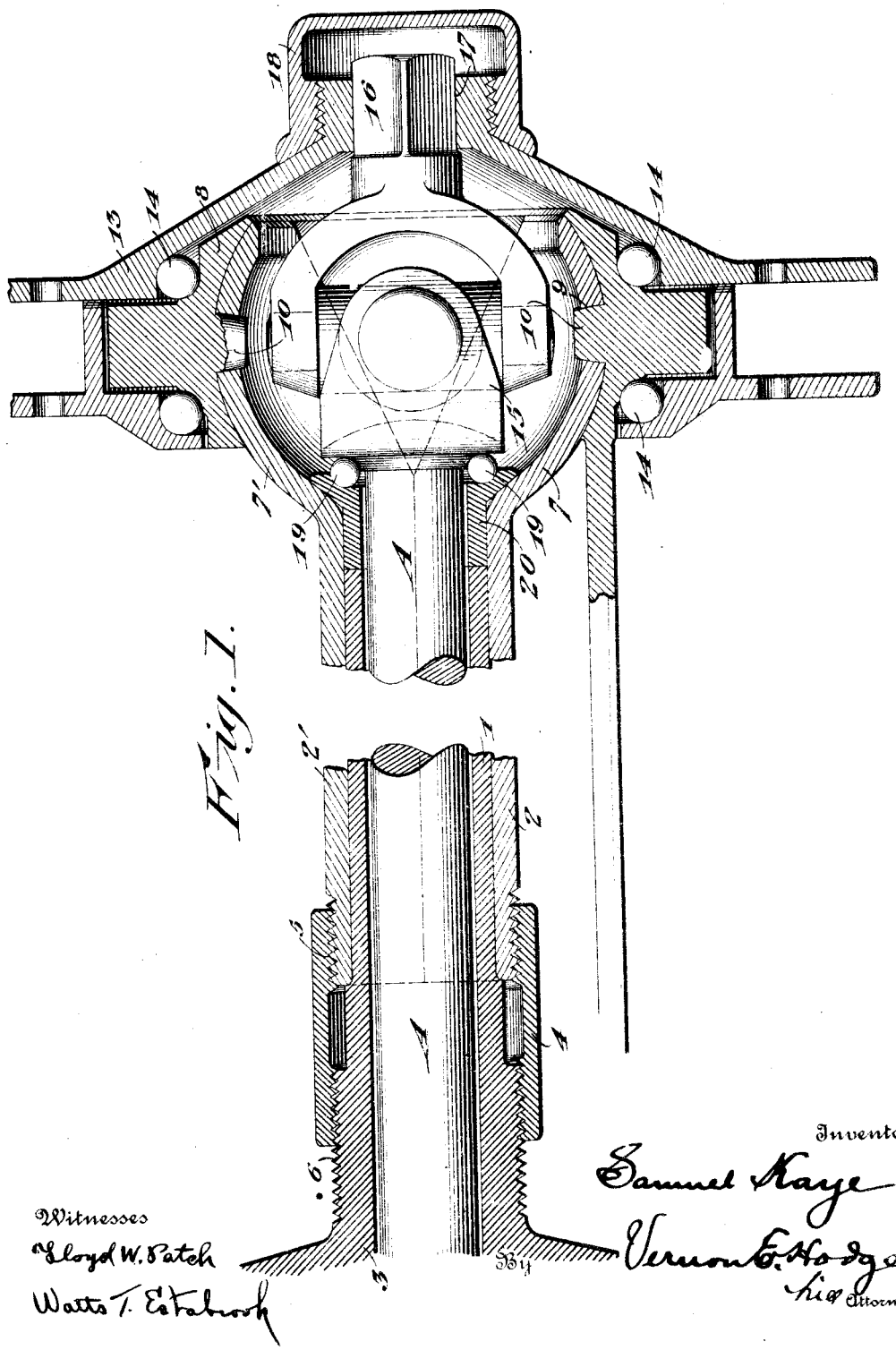

S. KAYE.
WHEEL.
APPLICATION FILED JULY 12, 1911.

1,062,472.

Patented May 20, 1913.
2 SHEETS—SHEET 1.

Witnesses
Lloyd W. Patch
Watts T. Estabrook

Inventor
Samuel Kaye
Vernon E. Hodges
His Attorney

S. KAYE.
WHEEL.
APPLICATION FILED JULY 12, 1911.
1,062,472.
Patented May 20, 1913.
2 SHEETS—SHEET 2.
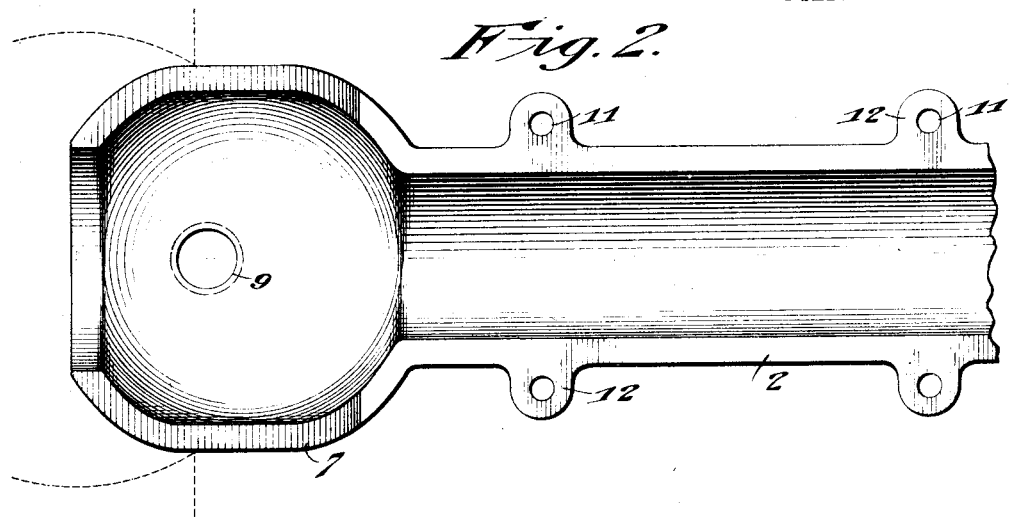
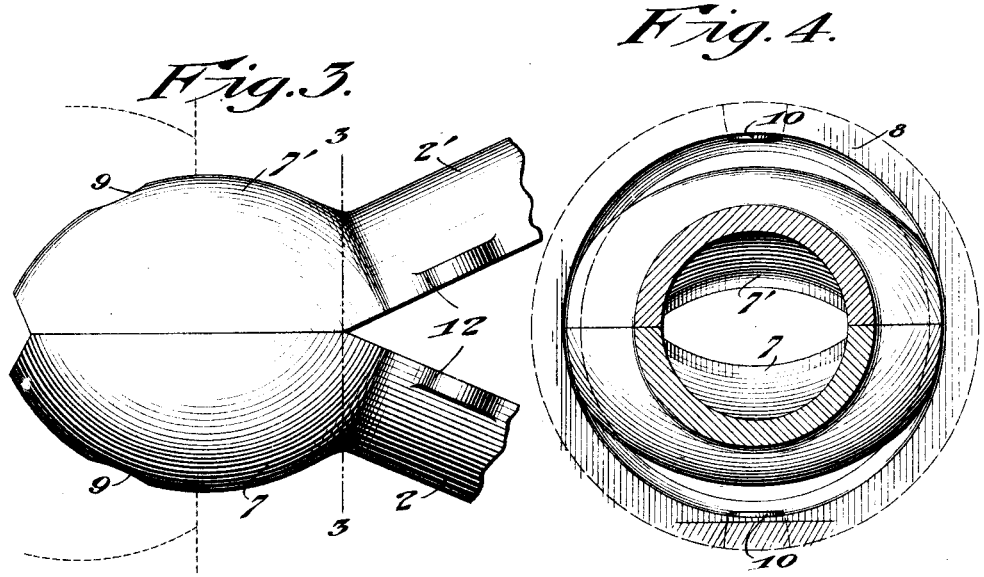
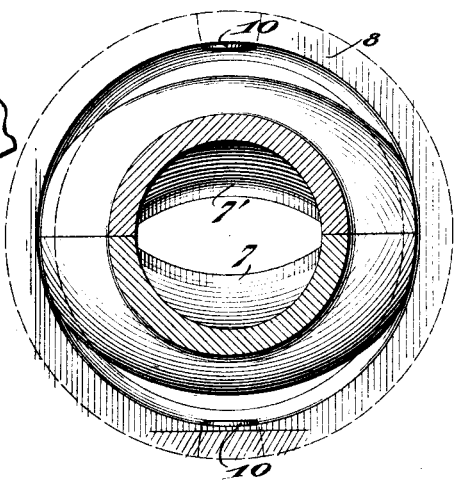
Witnesses
Lloyd W. Patch
Watts F. Estabrook
Inventor
Samuel Kaye
By Vernon C. Hodges
his Attorney

UNITED STATES PATENT OFFICE.

SAMUEL KAYE, OF COLUMBUS, MISSISSIPPI.

WHEEL.

1,062,472.  Specification of Letters Patent.  Patented May 20, 1913.

Application filed July 12, 1911. Serial No. 638,143.

*To all whom it may concern:*

Be it known that I, SAMUEL KAYE, citizen of the United States, residing at Columbus, in county of Lowndes and State of Mississippi, have invented certain new and useful Improvements in Wheels, of which the following is a specification.

My invention relates to an improvement in wheels, and more particularly it has reference to an improvement in the type of wheel set forth in my application, Serial No. 617,710, filed March 29, 1911, the object of the present invention being to reduce the parts to a minimum, attain simplicity, and so construct the parts that they may be easily, cheaply, and durably constructed, and when assembled will be effectual in the performance of their coöperative function in the production of a wheel well-adapted for all kinds of power-driven vehicles, such as automobiles, trucks, and the like, where provision is necessary for moving the wheels to different angles upon the housing in the guiding and control of the vehicle.

With the foregoing objects in view, this invention consists in certain novel features of construction and combinations of parts, which will be hereinafter fully described and pointed out in the claims.

In the accompanying drawings:—Figure 1 is longitudinal, vertical section through my improved wheel hub, axle, sleeve-housing, bearing ring, and other parts, Fig. 2 is a top plan view of the lower member of the axle housing, Fig. 3 is a view in side elevation of the ends of two of these sections, and Fig. 4 is a transverse section on the line 3—3 of Fig. 3.

A, A, represents the axle or shaft; 1, is the axle sleeve; and 2 is the axle housing, and the latter is connected at the inner end with the differential housing 3 by means of a collar 4, which has the large and small screw-threads 5 and 6, respectively, for drawing the two housings together. This is done by first screwing the collar on to the smaller threads of the differential housing 3, and then turning it in the opposite direction, so that the larger threads turn more rapidly upon the axle housing 2, while unscrewing more or less slightly from the threads 6 of the differential housing.

The axle housing 2 is made in two sections 2 and 2', as shown in Figs. 2 and 3, which may be made in any approved manner, but are preferably stamped out of sheet-metal, and are counterparts of each other in construction, so that they are interchangeable. They terminate at their outer ends in semi-spherical shells 7, 7', which are brought together, as shown in Fig. 3, when the parts are assembled, in order to admit of their being inserted into the annular bearing-ring 8. They are provided with orifices 9, 9, adapted to receive the studs 10, 10, projecting inwardly in vertical alinement with each other from the ring 8, which studs constitute an axis upon which the bearing ring is turned laterally in the guiding of the wheels of the vehicle. In assembling the foregoing parts, as previously mentioned the semi-spherical shells 7, 7', are brought together as shown in Fig. 3, and inserted into the bore of the bearing ring 8, after which they are expanded, and the housing sections 2 and 2' are brought together around the axle sleeve 1, as shown in Fig. 1, the orifices 9, 9, receiving the studs 10, 10, as shown in that figure, after which bolts are inserted through the holes 11, 11, in the ears 12, 12, and the collar 4 is screwed upon the threaded ends as previously explained. The wheel hub 13 is mounted to turn upon the ball bearings 14, 14, on the outer perimeter of the bearing ring, as shown in Fig. 1.

The axle shaft A has the usual universal joint 15, the outer end of which is squared as at 16, fitting an orifice 17 in the hub, and cap 18 screws over the end to protect the interior. Ball bearings 19, 19, are provided to receive any end thrust of the axle shaft A, they being confined between the universal joint 15 and the ball-bearing cone 20.

From the foregoing, it will be seen that the parts are easily and cheaply constructed and assembled, and a light but durable bearing for the wheel to turn on and for turning the wheel in guiding and controlling the machine is provided.

Having fully described my invention, what I claim as new and desire to secure by Letters Patent, is:—

1. The combination with a bearing ring, of an axle-housing made in sections terminating at one end in semi-spherical shells, the adjacent edges of which are at an obtuse angle to the adjacent edges of the axle-housing sections, whereby, when the edges of the semi-spherical shells are together, they are capable of insertion into the bore of the bearing-ring, wherein they are held against removal when the adjacent edges of the axle-housing proper are together.

2. The combination with a bearing-ring, of an axle-housing made in sections terminating at one end in semi-spherical shells, the adjacent edges of which are at an obtuse angle to the adjacent edges of the axle-housing sections, whereby, when the edges of the semi-spherical shells are together, they are capable of insertion into the bore of the bearing-ring, wherein they are held against removal when the adjacent edges of the axle-housing proper are together, and means for locking the semi-spherical shells to the bearing-ring when the housing edges are locked together.

3. The combination with a bearing-ring, of an axle-housing made in sections terminating at one end in semi-spherical shells, the adjacent edges of which are at an obtuse angle to the adjacent edges of the axle-housing sections whereby, when the edges of the semi-spherical shells are together, they are capable of insertion into the bore of the bearing-ring, wherein they are held against removal when the adjacent edges of the axle-housing proper are together, means for locking the semi-spherical shells to the bearing-ring when the housing edges are locked together, and means for locking the housing sections together whereby the semi-spherical shells are held in their locked engagement with the bearing-ring.

4. The combination with a bearing ring having a grooved inner bore and alined inwardly-projecting studs, of an axle housing made in sections, the ends of which terminate in semi-spherical bearings having orifices therein, which bearings are adapted to enter the bore of the bearing ring when compressed and their orifices to receive the studs when expanded, and means for securing the sections of the housing together.

5. The combination with a bearing ring having a grooved inner bore and alined inwardly-projecting studs, of an axle housing made in sections, the ends of which terminate in semi-spherical bearings having orifices therein, which bearings are adapted to enter the bore of the bearing ring when compressed, and their orifices to receive the studs when expanded, means for securing the sections of the housing together, a wheel hub rotatably mounted on said bearing ring, and ball-bearings interposed between the bearing ring and the hub.

6. The combination with an axle or shaft, differential and axle housing, the latter made in sections, and the adjacent ends of which differential and axle housing have small and large screw-threads, of a collar having internal screw-threads adapted to turn on the threads of the housings whereby to draw and hold them together.

In testimony whereof I affix my signature, in the presence of two witnesses.

SAMUEL KAYE.

Witnesses:
C. A. NEALE,
LLOYD W. PATCH.

Copies of this patent may be obtained for five cents each, by addressing the "Commissioner of Patents, Washington, D. C."